July 9, 1940.  E. R. MORANDO  2,207,548
JACK
Filed Aug. 17, 1939   2 Sheets-Sheet 1
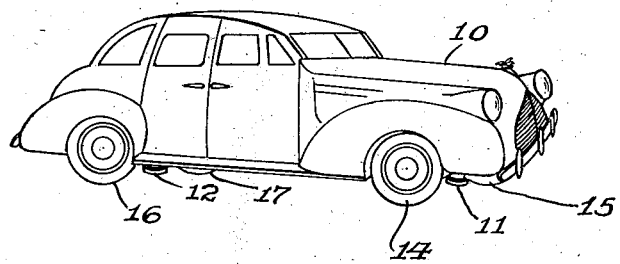
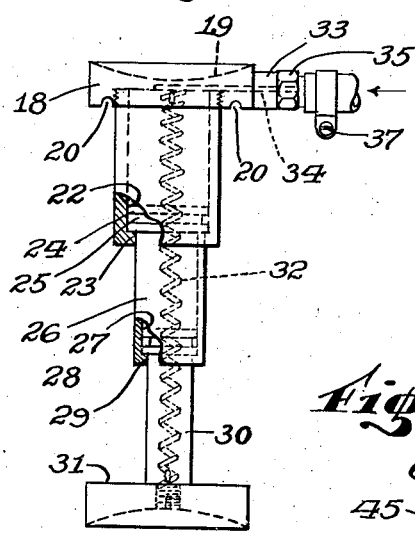
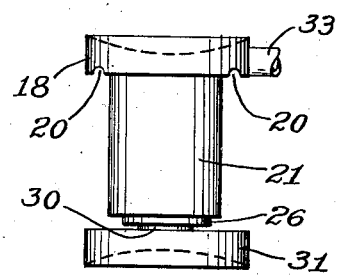
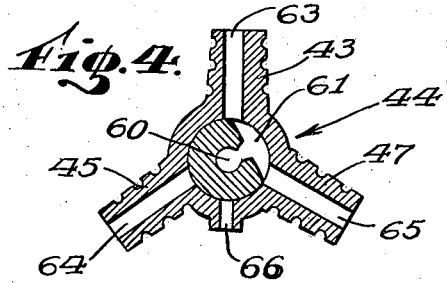
INVENTOR.
Emanuel R. Morando
BY
ATTORNEY.

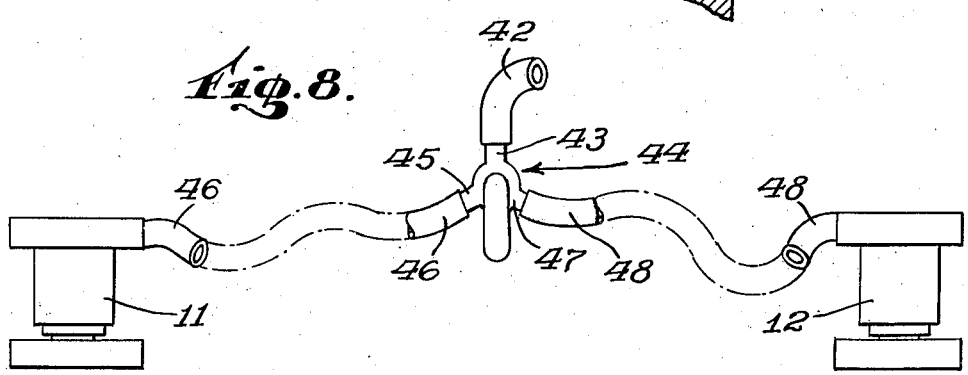
July 9, 1940.  E. R. MORANDO  2,207,548
JACK
Filed Aug. 17, 1939  2 Sheets-Sheet 2
INVENTOR.
Emanuel R. Morando
BY
ATTORNEY.

Patented July 9, 1940

2,207,548

UNITED STATES PATENT OFFICE 2,207,548

JACK

Emanuel R. Morando, Bronx, N. Y.

Application August 17, 1939, Serial No. 290,560

6 Claims. (Cl. 254—86)

This invention relates to improvements in jacks and is particularly directed to jacks for automotive vehicles operated by power from the motor and controlled from the dashboard of the vehicle.

The modern motor car employs tires of large cross-section and therefore when they get flat, the axle of the car is so close to the ground that it is very difficult to get a jack under it. The motorist gets his hands, face, and clothes soiled and if the weather is warm, he also becomes drenched with perspiration.

According to my invention, the car carries under the center of the rear axle, a telescopic jack, preferably inverted and having its base secured to the axle. Under the center of the front axle is a second telescopic jack also inverted and secured to said front axle.

A valve carried on the dash has a handle conveniently located. Aair pressure is led to the valve, and flexible conduits lead from the valve to the front axle jack and to the rear axle jack so that the handle may be thrown in one direction to actuate the front jack and in another direction to actuate the rear jack. When the handle is in its normal position, both jacks have their interiors open to the atmosphere so that after use the air may escape from either jack and may decrease to its minimum length under the urge of spring means thereon.

The jacks may be so proportioned that they raise the wheels clear of the pavement (for example one inch clearance).

The air may be obtained from one of the engine cylinders, and the valve is so arranged that that cylinder cannot fire while the valve is in a position other than its neutral position. The valve is also provided with a safety valve which will relieve very excessive pressures.

As stated above, I prefer to secure the jacks to the axles of the car in inverted positions but I do not wish to limit myself to this, nor do I wish to limit myself to the exact apparatus which I show by way of example in the drawings, in which:

Figure 1 is a view of a modern motor car equipped according to the invention; Figure 2 is an elevation of a telescopic jack in an inverted position for attachment to a motor car axle; Figure 3 is a view of the jack extended; Figure 4 is a lateral cross-section of the control valve; Figure 5 is a longitudinal cross-section of the valve; Figure 6 is a view showing a switch plate associated with the valve for cutting off current flow to the spark plug of the compressing cylinder supplying air to the valve; Figure 7 is a view showing one cylinder, of the engine of the motor car, carrying an attachment for obtaining compressed air from the cylinder and being provided with a spark plug for firing the cylinder when the engine is operating normally, and Figure 8 is a schematic view showing the pneumatic connections to the valve.

The motor car 10 in Figure 1 has a telescopic jack 11 secured to its front axle, and a telescopic jack 12 secured to its rear axle. When the jack 11 is distended it contacts the pavement and raises the front wheels 14 and 15 so that they clear the pavement an inch or two. On the other hand when the jack 12 is distended, the wheels 16 and 17 clear the pavement an inch or two, which is sufficient to permit the motorist to remove the wheel carrying the flat tire and substitute a spare.

One form of telescopic jack is shown in Figures 2 and 3 and consists of a plurality of sections. The base 18 may have a depression 19 formed therein, and has grooves 20 to locate straps or rods securing it to an axle. It also has a counterbored portion threaded to accommodate a cylinder 21 having a bore 22 and a portion 23 of reduced diameter forming a shoulder. A piston 24 carries a packing ring 25 and forms a working fit with the bore 22. A cylindric extension 26 is formed integral with the piston 24, and a bore 27 has therein a piston 28 also fitted with a packing ring. An annular shoulder 29 limits the travel of the piston 28 and prevents it from coming out of the bore 27.

A hollow rod 30 is formed integral with the piston 28 and carries a plate member 31. The hole in the hollow rod 30 extends through the piston 28 and one end of a spring 32 is secured at the bottom of said hole. The other end of the spring is secured to the base 18 within the counterbore so that the device will telescope when the air pressure is released as will be described.

A boss 33 carried by the base 18 has a passage 34 leading to the interior of the cylinder 21, and a suitable fitting 35 may have one end of a flexible conduit 36 such as 48 secured thereto by means of a clamp 37.

One cylinder of the motor car engine 38 (Figure 7) may have a fitting 39 screwed into its usual spark plug hole. The fitting is hollow so that its interior communicates with the interior of the cylinder. The spark plug 40 is carried at an angle in the fitting 39 so that its firing points are as near to the interior of the cylinder as possible, and a fitting 41 has one end of a flexible conduit 42 secured thereto, the other end of which conduit connects to the shank 43 of the valve 44. The shank 45 is connected (Figure 8) by a flexible conduit 46 to the front telescopic jack 11 and the shank 47 is connected to the other end of said conduit 48, this being to the rear telescopic jack 12, so that when the handle 50 of the valve is thrown in a position to supply air to the jack 11, the front axle is raised, and when the handle is thrown to supply air to the jack 12 the rear axle is jacked up.

Details of the valve are shown in Figures 4, 5, and 6. The valve has a threaded boss 51 which may extend through the dash 52 and may be secured thereto with lock nuts 53 and 54. The boss 51 has a bore 55 which communicates with a tapered bore 56 in the body of the valve and a tapered valve member 57 forms a working fit therein.

From the large end of the valve member extends a shaft 58 to which the handle 50 is secured by a set screw 49. A threaded shank 59 extends from the small end of the valve member, and a hole 60 therein extends to and communicates with the slotted gate 61. A safety valve 62 is screwed into the end of the shank 59.

The shank 43 has a hole 63 therein communicating with the tapered bore 56 and likewise the shanks 45 and 47 have respectively, holes 64 and 65 communicating with the bore 56, all said holes being adapted to be placed into communication with the gate 61 by the rotation of the handle 50. A bleeder hole 66 is also provided and when the handle 50 is in the "off" or normal position the holes 64 and 65 communicate with the atmosphere via the bleeder hole 66. This permits air to discharge from the jack just previously used so that its spring may cause it to telescope.

Now, in using one of the cylinders of the multicylinder engine as a compressor it is preferable that the spark be shut off from its spark plug. In my system this is done automatically when the handle 50 is moved from its neutral position. A disc 67 of insulation carries a metallic segment 68 having a terminal 69 thereon for connection by a wire 70 to the spark plug 40. The regular wire 71 leading to the spark plug from the ignition distributor is not disturbed. The disc 67 has a hole 72 which fits on the shank 59, and is prevented from turning by a hole 73 which engages a pin 74 in the valve body. A nut 75 is screwed on the shank 59 to adjust and maintain the seating of the valve member 57 and to retain the plate 67 on pin 74.

A contact arm 76 is secured on the shank 59 by a nut 78 locking it against the nut 75, suitable keying means being provided for locating the arm relative to the segment 68, and a finger 77 travels on a circular path and comes in contact with the segment to short the spark plug 40 whenever the arm is turned in either direction to operate a jack. Since the contact arm 76 and the button 77 are made of metal, and the arm 76 is mounted on the metal shank 59 which is in metallic contact with the dash 52 (via boss 51), the segment 68 is connected to ground when contacted by the button 77. Since the spark plug 40 has, in addition to its regular wire 71 leading from the ignition distributor, a second wire 70 leading to the segment 68, the ignition is shortcircuited insofar as the plug 40 is concerned when the valve is turned to either "F" or "R". When the valve is turned to "neutral" the button 77 is moved out of contact with the segment and the spark plug 40 may resume sparking and all the cylinders of the motor operate.

In order to change a tire the following steps are taken:
1—start the motor.
2—throw the handle 50 to the "F" position if a front tire is flat, or to the "R" position if a rear tire is flat.

By throwing the handle 50 as described, the front or the rear jack is connected to receive air from the engine cylinder; also, the ignition of that cylinder is shorted so that it cannot fire, so it acts as an air compressor and extends the jack in the manner described, so that the flat may be fixed or the wheel may be removed and a spare substituted.

The handle 50 is then turned to neutral, whereupon the air may pass out via the bleeder 66, permitting the spring 32 to collapse or telescope the jack. At the same time the plug 40 is unshorted and the motor functions normally.

Although a single embodiment of the invention is herein shown and described I do not intend to be limited as to details except insofar as set forth in the following claims.

I claim:
1. In combination with a motor vehicle, pneumatic jacking means carried on an axle of said vehicle and adapted to be extended vertically downward, an air connection to one of the cylinders of the motor, an air switch for placing said jacking means into fluid communication with said cylinder through said air connection, a contact arm carried on the movable portion of said air switch and grounded to said motor, a metallic segment connected to the spark plug on said cylinder and positioned to be contacted by said arm when said air switch is positioned to establish said fluid communication, whereby ignition current to said plug only is short-circuited and said cylinder, driven by the other cylinders of the motor, automatically functions as an air compressor to supply air to said jacking means, and an insulating block carried on said air switch for supporting said segment.

2. The combination according to claim 1 in which pneumatic jacking means is mounted on both axles of the vehicle, in which said air switch has several positions whereby it may be selectively positioned to establish fluid communication with either of said means, and in which the ignition current to said plug is short-circuited when said air switch is moved from neutral to either selective position.

3. A jacking device for motor vehicles including in combination with a vehicle having a dash board, a multicylinder gasoline motor, and a relatively fixed under structure; a hollow cylinder carried by said structure and having therein extensible means adapted to engage the ground for elevating a part of the vehicle, said cylinder having a nipple extending therefrom, spring means normally holding the first means against extension; a fitting disposed in the spark plug opening of one of the motor cylinders and having a spark plug receiver, said fitting being hollow and having a spark plug in the receiver, said plug having a wire conductor for normal operation in the motor ignition circuit; a nipple on said motor fitting; a control valve fixedly mounted on the rear of the dash and including a turnable element having a front stem, said element having therein a side recess, said valve having at least two nipples, the ducts of the valve nipples being on the plane of said recess; a pipe section connecting said cylinder nipple and one valve nipple, another pipe section connecting said motor fitting nipple and the other valve nipple; an insulating disc carried by the fixed valve mounting and having a conducting segment thereon, said segment having another wire leading to said plug, a metal arm carried by said turnable element and having thereon a terminal for selectively engaging said segment; and a handle rigid with said stem in front of the dash, whereby on operation of the handle fluid pressure may be transferred from the aforesaid motor cylinder to said jack cylinder for extending the first mentioned means against the action of said spring means, said segment and the metal arm being at the same time effective to open the ignition circuit to said plug while fluid is being transferred to said jack cylinder.

4. A jacking apparatus for motor vehicles including in combination with a vehicle having a dash board, a multicylinder gasoline motor, and a relatively fixed under structure: a hollow cylinder carried by said structure and having therein extensible means adapted to engage the ground for elevating part of the vehicle, said cylinder having a nipple extending therefrom, spring means normally holding the first means against extension; a fitting disposed in the spark plug opening of one of the motor cylinders and having a spark plug receiver, said fitting being hollow and having a spark plug in the receiver, a nipple on said motor fitting; a control valve fixedly mounted on the rear of the dash and including a turnable element having a front stem, said element having therein a side recess, said valve having at least two nipples, the ducts of the valve nipples being on the plane of said recess; a pipe section connecting said cylinder nipple and one valve nipple, another pipe section connecting said motor fitting nipple and the other valve nipple, and a handle rigid with said stem on the dash, whereby on operation of said handle fluid pressure may be selectively transferred from the motor to said cylinder for extending the first mentioned means against the action of said spring means.

5. A fluid control and ignition control means for vehicles comprising in combination with a vehicle having a gasoline motor, a dash board or fixture, and a cylinder below the vehicle body and having relatively extensible jacking means therein, said cylinder having a nipple projecting therefrom; a fitting or plug disposed in the spark plug opening of one of the motor cylinders, said fitting being in communication interiorly with the motor cylinder and having in a portion thereof a spark plug, an interiorly communicating nipple on another portion of said fitting; a control valve fixedly mounted on the dash and including a turnable element having a stem, said element having therein a side recess, said valve having at least two nipples, the ducts of the valve nipples being on the plane of said recess; a pipe section connecting said cylinder nipple and one valve nipple, another pipe section connecting said motor fitting nipple and the other valve nipple: an insulating disc carried by the fixed portion of said control valve and having a conducting segment thereon, a conductor extending from said segment to the wiring of the spark plug, a metal arm carried by said turnable element and having a terminal for selectively engaging said segment; and a handle rigid with said stem, whereby on operation of the handle fluid pressure may be transferred from the motor cylinder to the jack cylinder for extending said jacking means, the segment of said insulating disc and the metal arm with its terminal being adapted to be effective to open the ignition circuit to the spark plug while the fluid is being transferred.

6. In a jacking apparatus for a motor vehicle comprising fluid actuated means including a jacking cylinder having thereon a nipple, a fluid valve control, and means for breaking the ignition circuit of the motor across the spark plug of one motor cylinder while fluid is being passed therefrom to the jacking cylinder; a fitting in the spark plug opening of said motor cylinder and having in one portion thereof another opening wherein the spark plug is mounted, said fitting being hollow and communicating interiorly with said motor cylinder, and a nipple on another portion of said fitting, said latter nipple being adapted to be connected with the nipple of the jacking cylinder.

EMANUEL R. MORANDO.